June 26, 1956
V. A. GALLOWAY
2,752,194
LOCKING MEANS FOR DOORS OF GARBAGE DUMP TRUCKS OR THE LIKE
Filed Feb. 15, 1951
4 Sheets-Sheet 2
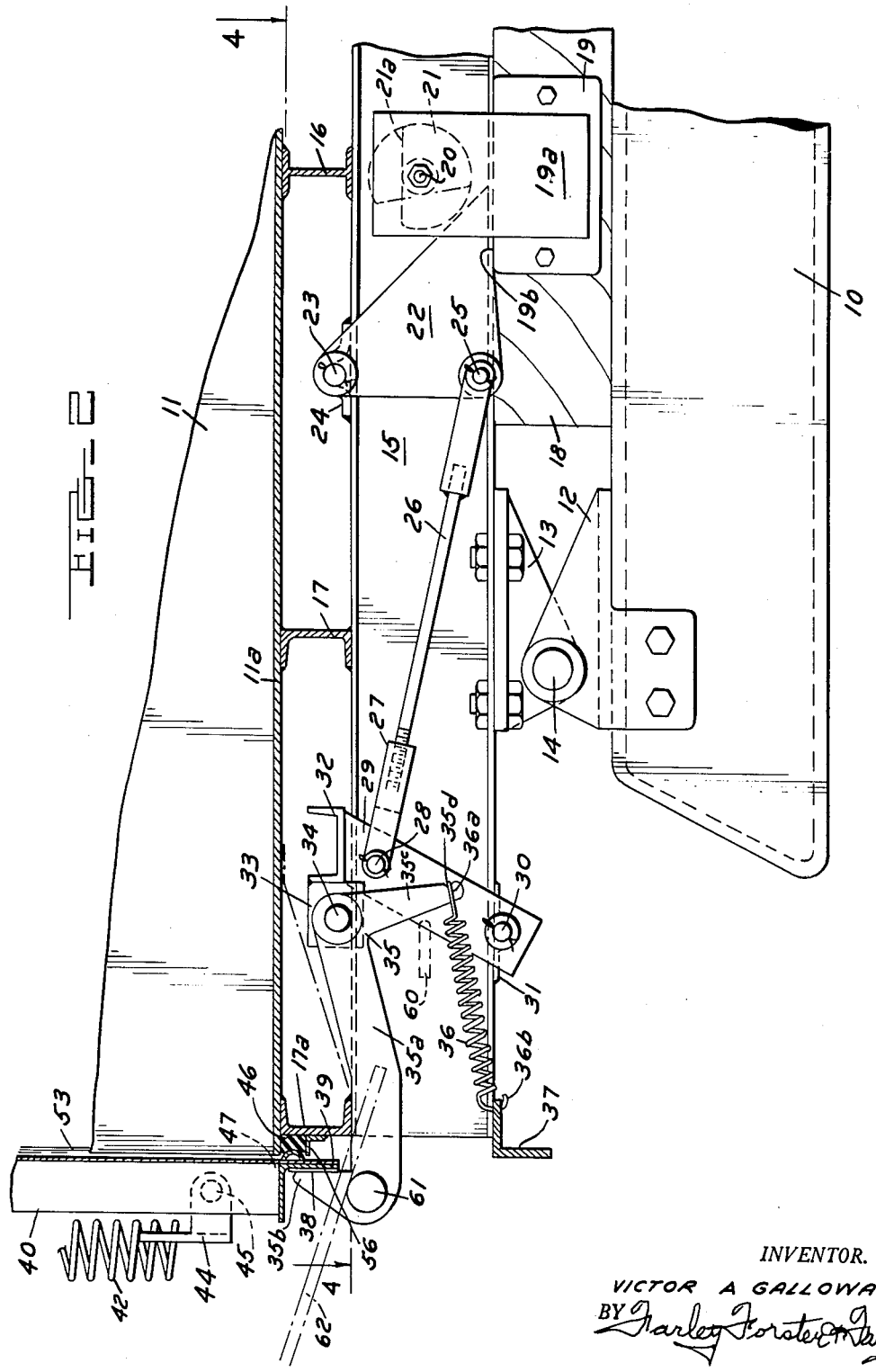
INVENTOR.
VICTOR A GALLOWAY
BY Farley Forster & Farley
ATTORNEYS

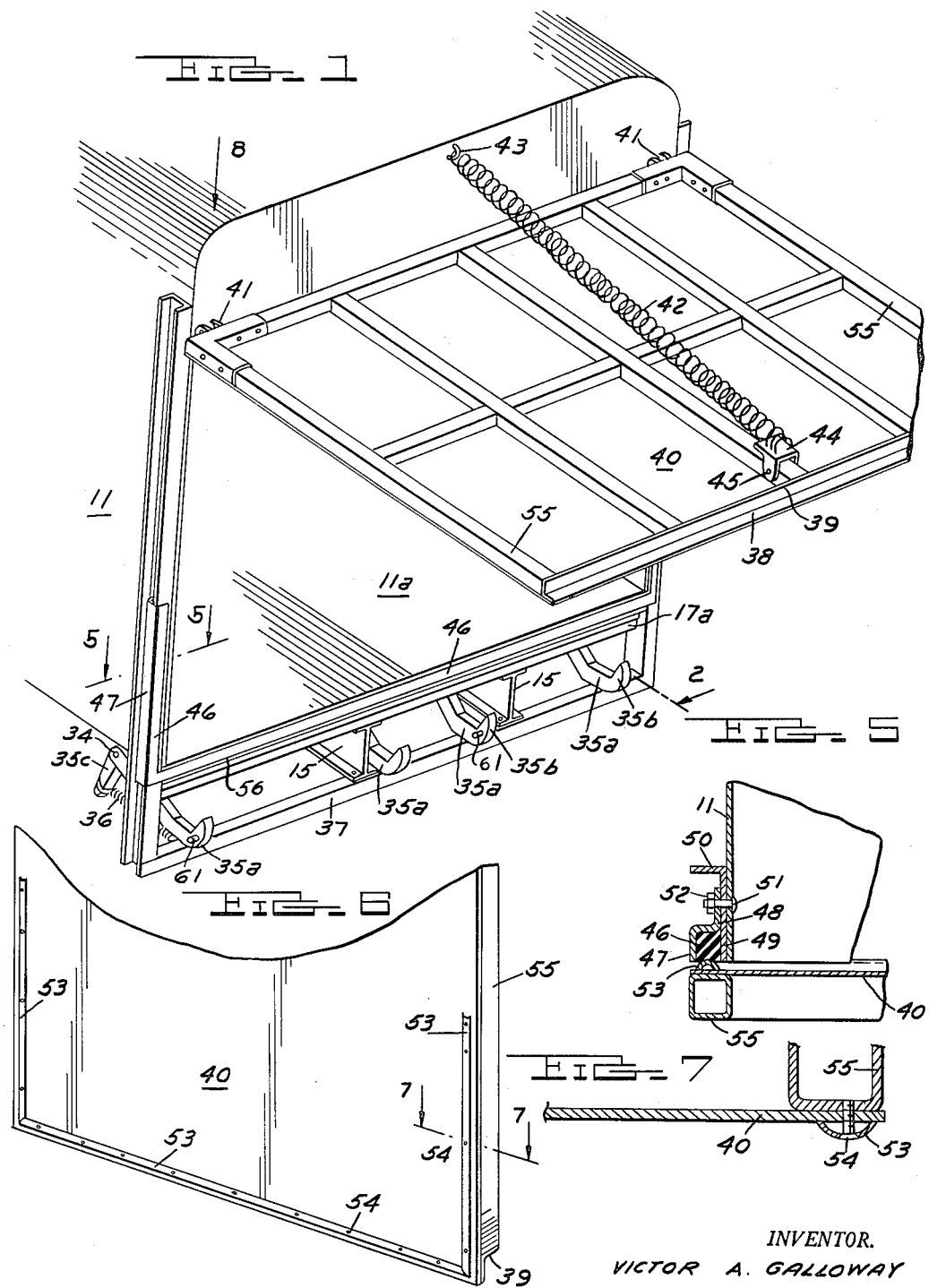

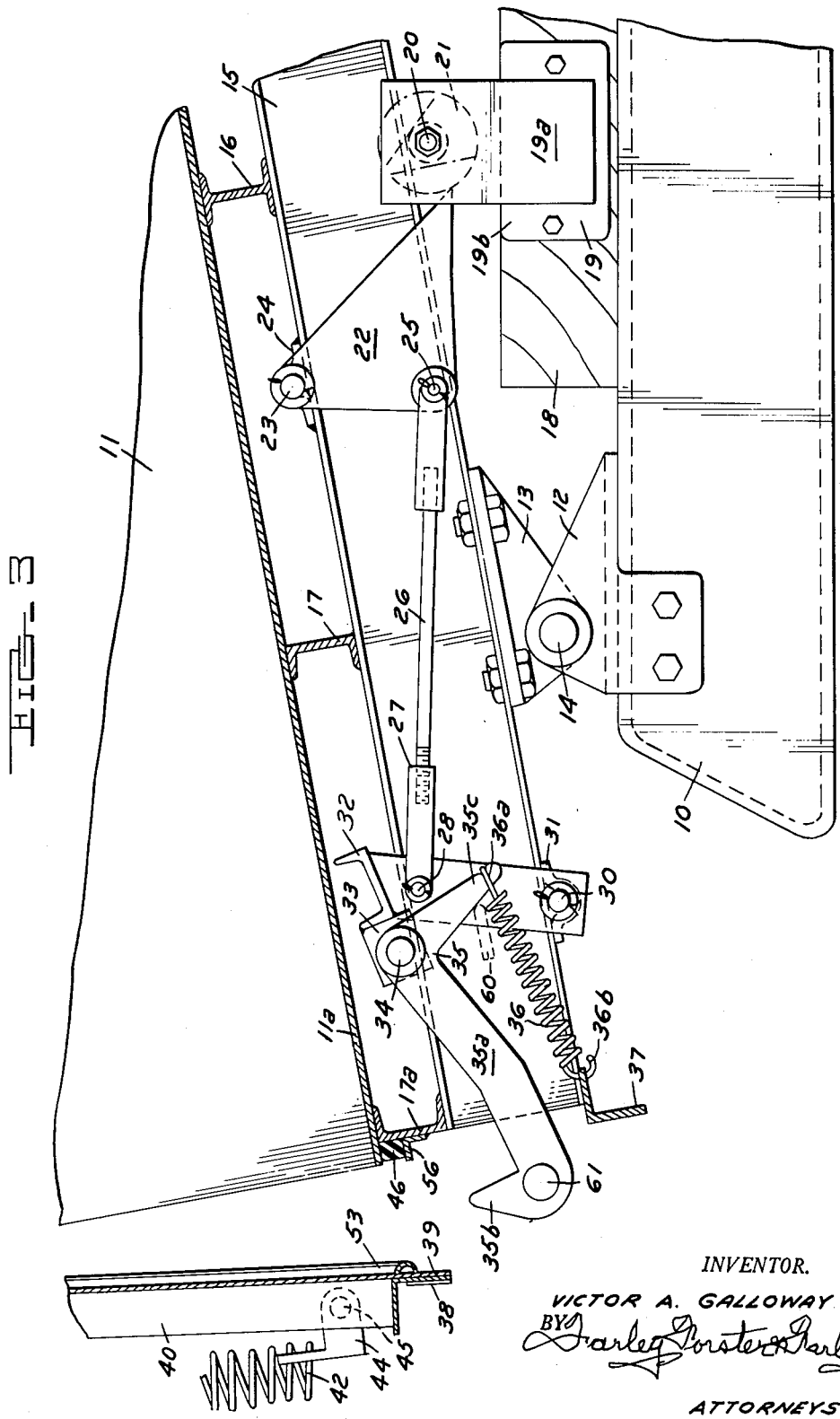

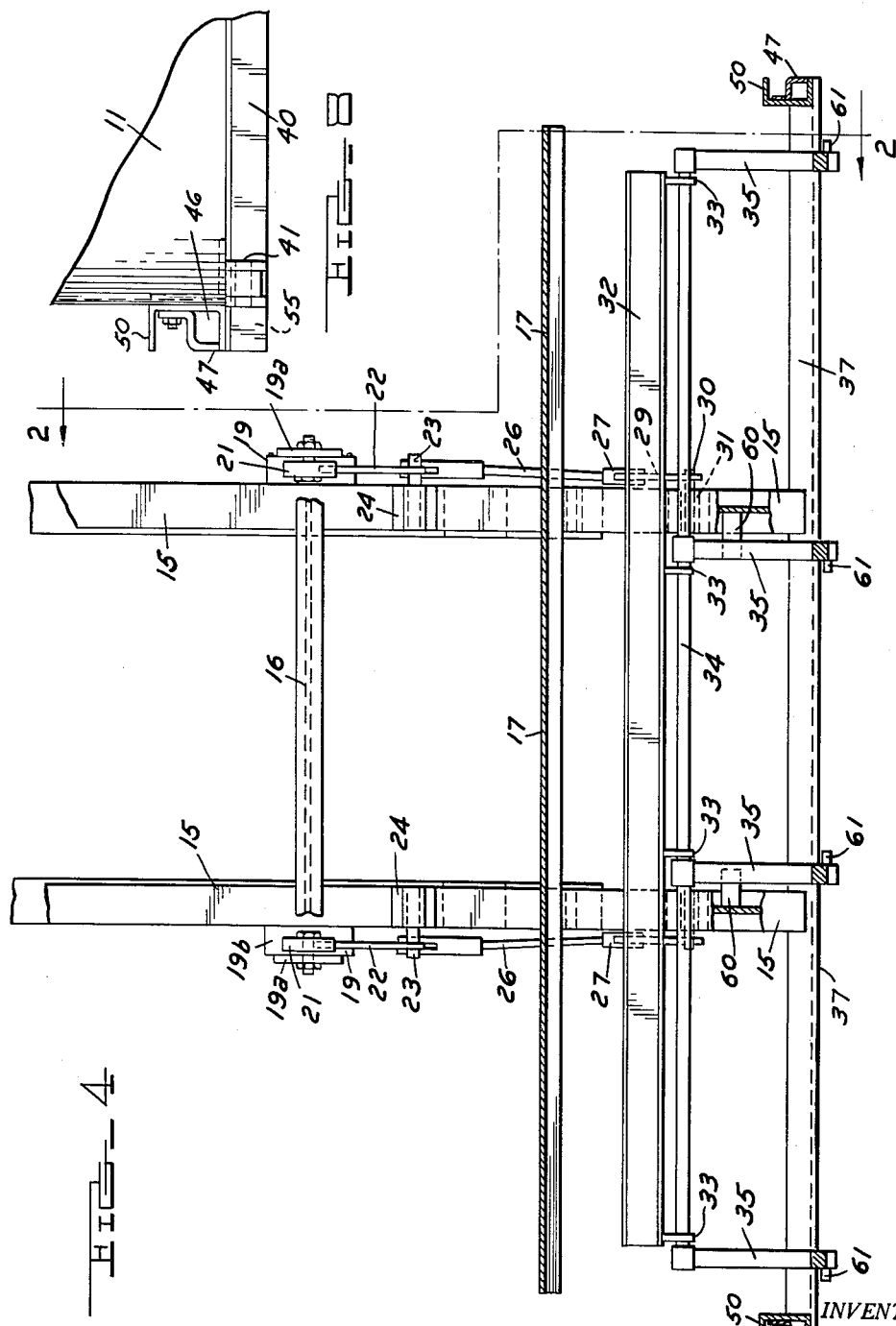

United States Patent Office 2,752,194
Patented June 26, 1956

2,752,194

LOCKING MEANS FOR DOORS OF GARBAGE DUMP TRUCKS OR THE LIKE

Victor A. Galloway, St. Clair Shores, Mich.

Application February 15, 1951, Serial No. 211,141

7 Claims. (Cl. 298—23)

This invention relates to locking and sealing means for the doors of dump trucks particularly adapted for the hauling of garbage. As is well known, the garbage that is hauled away from households to the place of disposal normally has a large water content that leaks through the doors on to the highways, which is, of course, most objectionable. Also, garbage trucks as heretofore constructed have employed various types of closures which are rather cumbersome and time consuming to operate.

The present invention has for its principal object to provide a new and improved construction for effecting a liquid-tight sealing the lower portion of the closure door for a garbage dump truck and for providing a locking means for such doors that is automatically actuated to and from locking position by the movement of the dump body to and from dumping position.

Briefly stated, the invention consists in the incorporation with a rear swinging door of a garbage dump truck of highly effective sealing means interposed between the body of the truck and the lower portions of the rear swinging door closure, together with latching means for clamping the doors in hermetically tight engagement with said sealing means, adapted to be automatically actuated into clamped engagement with the door and to be automatically released from clamping engagement therewith by camming devices, operated by the movement of the dump body upon its pivotal connection to the truck chassis, from its inclined dumping position to its horizontal transporting position.

The above and other objects of the invention, such as the provision of simple, sturdy and highly effective automatic means of the character described above of relatively low cost but highly effective in operation; that will be automatically brought into play by the mere action of moving the dump body to and from its horizontal transporting position to its inclined dumping position, as well as a novel spring connection for the hinged rear door that will cause the door to be moved to a fully opened position upon release of the latching means, will appear more fully from the following more detailed description and by reference to the accompanying drawings forming a part hereof wherein:

Fig. 1 is a perspective view of the rear of a garbage dump truck embodying the present invention, with the rear door shown in fully open position;

Fig. 2 is a vertical section on the line 2—2 of Fig. 4, showing the dump body in horizontal transporting position and with the door locking means shown in locked postion;

Fig. 3 is a view similar to Fig. 2, showing the dump body in inclined position with the door locking means moved to unlocked position;

Fig. 4 is a section on the line 4—4 of Fig. 2;

Fig. 5 is a horizontal section on the line 5—5 of Fig. 1, showing a detail of the door sealing means;

Fig. 6 is a perspective detail broken away of the inner face of the hinged rear door;

Fig. 7 is a section on the line 7—7 of Fig. 6; and

Fig. 8 is a detail of a door hinge as seen from the direction of the arrow 8 in Fig. 1.

As shown in the drawings, the numeral 10 indicates the chassis frame of a garbage dump truck to which is pivotally secured a dump body 11, the pivotal connection between the body 11 and chassis 10 being made by means of a pair of brackets 12 and 13 attached respectively to the chassis and dump body and adapted to receive a pivot pin 14. The dump body is carried by a pair of longitudinally extending structural steel members or longerons 15 and a plurality of transverse structural members such as indicated at 16, 17, 17a. A pair of wooden buffer and supporting blocks 18 are suitably secured to the top of each of the longitudinal side frame members of the chassis 10. Suitably secured to each of the buffering blocks 18 is a bracket 19 having an offset upwardly projecting web or plate portion 19a to which is pivotally secured, as by the bolt 20, a freely rotatable cam 21. The cam 21 is shaped as a segment of a cylinder having a portion thereof cut away to form a flat face 21a so that the cam 21 will be off-center weighted to normally assume, under the influence of gravity, the position shown in the dotted lines in Fig. 2 of the drawings, with the cut-away portion 21a being located at the top portion of the cam when in this dotted-line position and so that the rounded or cylindrical part of the cam will, as shown in Fig. 2, project into the path of a cam-actuated plate 22 pivotally secured, as at 23, to a bracket 24 welded or otherwise suitably secured to the upper web of the frame longeron 15. The cam-actuated plate 22, as clearly shown in the drawings, is in the shape of a right triangle and is pivotally carried adjacent its upper acute angle on the pin 23 so that when the parts are in the position shown in Fig. 2 the other acute angle thereof normally extends forwardly under the cylindrical portion of the cam 21, with the lower face of the forward end of the plate 22 in contacting engagement with the upper face 19b of the thick part of bracket 19.

To the rearward right-angled portion of the triangular plate 22 is pivotally connected, as by the pin 25, the forward end of an adjustable actuating link 26, the rear end of which actuating link has screw threaded to it for longitudinal adjustment a clevis 27 pivotally connected, as at 28, to an upwardly extending inclined bar 29, the lower end of which is pivotally connected, as by the pin 30, to a bearing bracket 31 suitably secured, as by welding, to the lower web of the body longeron 15.

As will be seen from Fig. 4 of the drawings, there are two sets of cams 21, cam-actuating plates 22, connecting rods 26 and bars 29, one set attached to each of the longerons 15. Fixedly attached to the upper ends of each of the bars 29 is a transversely extending channel member 32 to the rear flange of which is suitably secured, as by welding, a plurality of rearwardly projecting bearings 33.

Rotatably carried in the bearings 33 is a shaft 34 to which is nonrotatably secured at spaced intervals a plurality of latches 35. Each of the latches 35 is in the form of a bell-crank lever consisting of a longer substantially horizontal extending arm 35a which terminates at its end in a hook portion 35b, and a shorter arm 35c which extends downwardly and has a small notch 35d formed therein for the reception of an eye-like terminal loop 36a of a coiled expansion spring 36, the other terminal loop 36b of said spring being anchored in the leg of a rear transverse angle-iron structural steel frame bracing member 37 secured to the lower flange of the dump body longerons 15. Spring 36 is placed under tension so as normally to urge the hook 35b of the bell-crank latch 35 into the position shown in Fig. 2 of the drawings, to engage with a reinforcing strip 38 secured to the vertically extending web of an angle iron 39 secured at the bottom of a swinging door 40. The shorter vertical arm 35c of the bell-crank latch 35 is adapted to engage a stop 60 for actuating the latch to the unlatched position shown in Fig. 3 in a manner presently to be described more fully.

The door 40 is hingedly connected at its upper end by a pair of hinges indicated generally by the reference character 41. An expansion spring 42 has its upper end connected to a hook 43 projecting from the rear wall of the truck body and spaced several inches above the pivotal axis of the hinges 41. The lower end of the spring 42 has a number of its lowermost coils threaded into suitably spaced apertures provided in a spring bracket 44 pivotally connected, as at 45, adjacent to the lower end of the door 40. The connection of the upper end of the spring 42 to the hook 43, spaced an appreciable distance above the pivotal axis of the hinges 41, provides a mechanical advantage for the spring 42 such that when the bell crank latches 35 have been released from the lower end of the door a slight push upwardly and outwardly upon the lower end of the door will enable the spring to swing the door automatically to its fully opened position, as shown in Fig. 1 of the drawings.

Extending around the bottom of the rear opening of the truck body, up along the lower side edges thereof, for about a third of the height of such rear opening is a sealing means for liquid tight sealing the lower portion of the door and thus effectively preventing the escape of moisture when the door is in its closed position so as to prevent drippage of moisture from the garbage when the truck is transporting the same. This sealing means shown most clearly in the detailed views, Figs. 5 and 8, consists of a rubber sealing strip 46 of rectangular cross-section clamped between an offset flange 47 of a clamping strip 48 and the web 49 of a reinforcing angle member 50 which extends around the bottom of the opening formed in the rear of the truck body; the strip 48 and angle plate being secured to the wall of the body at spaced intervals by carriage bolts 51 and nuts 52. Extending around the bottom and lower portions of the side walls of the door 40 for engaging with the rubber sealing strip 46 is a projecting half-round bead 53 which is suitably secured to the inner face of the door 40, as by screws 54, which are screw threaded into the rectangular shaped tubular reinforcing members 55, extending along the outer side edges of the door 40, and also threaded into the web of the angle iron 39 and reinforcing strap 38 that extend along the bottom of the door. The rubber sealing strip 46 for engagement with the bead 53 along the bottom of the door is suitably secured between the floor plate 11a of the truck body and small angle iron 56 secured to the rear transverse structural channel member 17a of the dump body.

The manner in which the latching means operates is as follows: When the dump body is in its horizontal load transporting position shown in Fig. 2 of the drawings, with the hook 35b of the latch 35 in locked engagement with the lower end of the door 40, the triangular cam-actuated plate 22 will have its forwardly extending acute angle projecting under the cylindrical portion of the cam 21, which at this time is in the dotted-line position shown in Fig. 2. When, however, the dump body is swung from the horizontal position shown in Fig. 2 to the inclined position shown in Fig. 3 upon the pivot pin 14, that portion of the dump body upon which the triangular cam plate 22 is mounted will move upwardly and hence the upper inclined forward face of the cam plate 22 will engage the cylindrical face of cam 21. During the initial upward movement of the plate 22, as the body 11 is swung to inclined position upon hinge pin 14, the upper face of the plate 22 will be engaged with the cylindrical face of cam 21 and hence the lower portion of the plate 22 will be thrust rearwardly thus producing a pivotal movement of the plate 22 upon the pivot pin 23 moving the lower end of the plate rearwardly and causing the connecting link 26 to push rearwardly upon the upper end of the inclined bar 29. As there are two sets of cams 21, cam plates 22, connecting rods 26 and bars 29, the rearward motion of the connecting rods 26 being communicated to the bars 29 at a point adjacent the upper ends of said bars will cause said bars to pivot upon the pivot pins 30, thus swinging the upper ends of the bars rearwardly with a component of movement that is mainly horizontal until the clamping force of the hooks 35b at the rear end of the latches 35 have had their clamping force released. Shortly after the clamping action of the hooks 35 has been released the continued rearward movement of the lower end of the triangular cam plate 22 produced by its engagement with the cam 21 as the body is moved to its inclined position brings the short vertical arm 35c of the bell crank latch 35 into contacting engagement with the stops 60 which project laterally from and are secured to the vertical web of the longerons 15. As the swinging of the dump body upon the pivots 14 proceeds, the engagement of the inclined forward end of plates 22 with cams 21 will produce further rearward movement of the lower end of the cam plates 22, connecting rods 26 and upper ends of the bars 29, transverse channel member 32, with the shaft 34 and latch members 35 carried thereby, and will cause the bell-crank latch members 35 to be rotated by the engagement of the arms 35c thereof with the stops 60 until the hooked ends 35b at the ends of the longer arms 35a of the bell-crank latches thereof are swung downwardly out of the path of the lower end of the door 40, into fully unlatched position as shown in Fig. 3. The door may then be swung upwardly on its hinges 41 by the operator to its fully opened position shown in Fig. 1 assisted by the action of springs 42, which hold the door in such position, after which the body 11 is swung on pivots 14 to a fully inclined dumping position to eject clearly the contents thereof, in which position the cam plates 22 will be raised fully out of contact with cams 21 so that the latter will be automatically rotated by the force of gravity from the dot-and-dash line position to the dotted-line position shown in Figs. 2 and 3.

When the body is moved from its fully inclined dumping position to the horizontal transport position shown in Fig. 2, the lower face of the forward projecting acute angled end of the cam-actuated plates 22 will engage the flattened cut-away faces 21a of the cams 21 which will have been moved by the force of gravity on the eccentrically weighted lower end thereof to the dotted-line position shown in Fig. 2 and will move the cams 21 upon their pivotal mountings from the dotted-line position to the dot-and-dash line position shown in Fig. 2, thus permitting the forward ends of the triangular cam-actuated plates to pass freely below the cams 21. Towards the end of the downward movement of the cam plates 22, as the body is swung towards its horizontal position, the shorter vertical arms 35c of the bell-crank latches 35 will be moved out of contact with the stops 60 and the pull of the springs 36 on the lower end of the arms 35c will rotate the bell-crank latch levers 35 back towards latching position, it being understood that the operator will first push the lower end of the door 40 back into closed position. During the final movement of the dump body towards its horizontal position, the lower face of the forward acute end of the cam-actuated plates 22 will strike against the top faces 19b of the bracket 19 thus rotating the cam-actuated plates 22 in Fig. 3 thus exerting a strong forward pull upon the connecting rods 26 which is communicated to the top end of the bars 29, thus to cause the hooked ends 35b of the latches to exert a rigid clamping pressure against the lower end of the door 40 to force the bead 53 into hermetically sealed engagement with the rubber gasket strips 46.

As occasions may arise when it would be necessary or desirable to unlock the latches 35 from their locked engagement with the door 40, while the truck body is in its horizontal position each of the latches is provided with a laterally projecting pin 61 between which and the lower end of the transverse bracing member 17a a pry bar, as indicated in dot-and-dash lines at 62 in Fig. 2, may be engaged to force the hooked ends 35b of the bell-crank latches 35 into unlocked position.

While I have shown and described an embodiment of my invention which has proved highly satisfactory in practical use, it will be understood that many changes, variations and modifications may be resorted to without departing from the spirit of the invention as defined in the claims hereunto appended.

I claim:

1. In a dump truck adapted for carrying garbage or the like, a chassis, a body pivotally mounted on said chassis for movement to and from either an inclined dumping or a horizontal transporting position, said body having a rear dumping opening, a closure for said opening hingedly connected adjacent to its upper end to said body, resilient moisture repellent sealing means interposed between said body and the bottom and lower side edges of said closure, latching means for engaging the lower edge of said closure and holding it in tightly clamped liquid tight sealing engagement with said sealing means and cam means automatically actuated by the movement of said body from its horizontal to its inclined position to move said latching means to unlocked disengaged position, comprising a swinging latch carrying structure, a plurality of spaced locking latches pivotally carried thereby for movement into clamped engagement with the bottom of said closure, a pivoted cam actuated means carried by said body and connections therefrom to said latch-carrying structure, cam means carried by said chassis interposed in the path of movement of said cam-actuated means for automatically swinging said structure to disengage the latches carried thereby from their clamped engagement with said closure as said body is initially moved from its horizontal to its inclined dumping position, and stops adapted to engage said latches after further movement of said body to swing said latches out of the path of movement of said closure to fully opened position.

2. In a dump truck adapted for carrying garbage or the like, a chassis, a body pivotally mounted on said chassis for movement to and from either an inclined dumping or a horizontal transporting position, said body having a rear dumping opening, a closure for said opening hingedly connected adjacent to its upper end to said body, resilient moisture-repellent sealing means interposed between said body and the bottom and lower side edges of said closure, latching means for engaging the lower edge of said closure and holding it in tightly clamped liquid tight sealing engagement with said sealing means and cam means automatically actuated by the movement of said body from its horizontal to its inclined position to move said latching means to unlocked disengaged position, comprising a swinging latch-carrying structure, a plurality of spaced locking latches pivotally carried thereby for movement into clamped engagement with the bottom of said closure, a pivoted cam actuated means carried by said body and connections therefrom to said latch-carrying structure, eccentrically weighted cams carried by said chassis normally held by gravity in the path of movement of said cam actuated means for automatically engaging the latter and thereby swinging said structure to disengage said latches from their clamped engagement with said closure during the initial movement of said body as it is swung from its horizontal towards its inclined dumping position.

3. In a dump truck adapted for carrying garbage or the like, a chassis, a body pivotally mounted on said chassis for movement to and from either an inclined dumping or a horizontal transporting position, said body having a rear dumping opening, a closure for said opening hingedly connected adjacent to its upper end to said body, resilient moisture-repellent sealing means interposed between said body and the bottom and lower side edges of said closure, latching means for engaging the lower edge of said closure and holding it in tightly clamped liquid tight sealing engagement with said sealing means and cam means automatically actuated by the movement of said body from its horizontal to its inclined position to move said latching means to unlocked disengaged position, comprising a swinging latch-carrying structure, a plurality of spaced locking latches pivotally carried thereby for movement into clamped engagement with the bottom of said closure, a pivoted cam actuated means carried by said body and connections therefrom to said latch-carrying structure, eccentrically weighted cams carried by said chassis normally held by gravity in the path of movement of said cam actuated plate for automatically engaging the latter and thereby swinging said structure to disengage said latches from their clamped engagement with said closure during the initial movement of said body as it is swung from its horizontal towards its inclined dumping position, said cams having a portion thereof cut away to provide a clearance space through which said cam-actuated plate may pass without being actuated by said cams as said body is swung from its inclined dumping to its horizontal transporting position.

4. In a dump truck adapted for carrying garbage or the like, a chassis, a body pivotally mounted on said chassis for movement to and from either an inclined dumping or a horizontal transporting position, said body having a rear dumping opening, a closure for said opening hingedly connected adjacent to its upper end to said body, resilient moisture-repellent sealing means interposed between said body and the bottom and lower side edges of said closure, latching means for engaging the lower edge of said closure and holding it in tightly clamped liquid tight sealing engagement with said sealing means and cam means automatically actuated by the movement of said body from its horizontal to its inclined position to move said latching means to unlocked, disengaged position, comprising a swinging latch-carrying structure, a plurality of spaced locking latches pivotally carried thereby for movement into clamped engagement with the bottom of said closure, a pivoted cam actuated means carried by said body and connections therefrom to said latch-carrying structure, spring means for normally urging said latches on their pivotal connection to said latch-carrying structure towards latching position, cam means carried by said chassis interposed in the path of movement of said cam-actuated means for automatically swinging said structure to disengage the latches carried thereby from their clamped engagement with said closure as said body is initially moved from its horizontal to its inclined dumping position, and stops adapted to engage said latches after further movement of said body to swing said latches out of the path of movement of said closure to fully opened position.

5. In a dump truck adapted for carrying garbage or the like, a chassis, a body pivotally mounted on said chassis for movement to and from either an inclined dumping or a horizontal transporting position, said body having a rear dumping opening, a closure for said opening hingedly connected adjacent to its upper end to said body, resilient moisture-repellent sealing means interposed between said body and the bottom and lower side edges of said closure, latching means for engaging the lower edge of said closure and holding it in tightly clamped liquid tight sealing engagement with said sealing means and cam means automatically actuated by the movement of said body from its horizontal to its inclined position to move said latching means to unlocked, disengaged position, comprising a swinging latch-carrying structure, a plurality of spaced locking latches pivotally carried thereby for movement into clamped engagement with the bottom of said closure, a pivoted cam actuated plate carried by said body and connections therefrom to said latch-carrying structure, spring means for normally urging said latches on their pivotal connection to said latch-carrying structure towards latching position, cam means carried by said chassis interposed in the path of movement of said cam-actuated means for automatically swinging said structure to disengage the latches carried thereby from their clamped engagement with said closure as said body is initially moved from its horizontal to its inclined dumping position, and stops adapted to engage said latches after further movement of said body to swing said latches out of the path of movement of said closure to fully opened position, said cams having a portion thereof cut away to provide a clearance space through which said cam-actuated plate may pass without being actuated by said cams as said body is swung from its inclined dumping to its horizontal transporting position, and abutments fixed to said chassis for engaging said plate and moving and holding said latches into rigid clamping engagement during the final movement of said body towards horizontal position with said closure thereby to hold it in hermetically sealed engagement with said sealing means.

6. Latching mechanism adapted for use with the hinged closure of a dump body of the type pivotally carried by a chassis frame for movement between a load-carrying position and a dumping position, comprising a latch member, a latch member support pivotally carried by said body and upon which said latch member is pivotally mounted, means connecting said latch member to said support for pivotal movement to a position of disengagement with said closure, means for connecting said latch member support to said body for movement having a component in the direction of initial opening movement of said closure, and cooperating means carried by said body and said chassis frame for actuation by tilting movement of said body towards dumping position to cause an initial movement of said latch support to loosen said latch member and additional means carried by said chassis frame and projecting into the path of movement of said latch member as said body is tilted to cause said latch member to be completely disengaged from, and moved out of the path of movement of, said closure as the latter is swung to fully opened position.

7. Latching mechanism adapted for use with the hinged closure of a dump body of the type pivotally carried by a chassis frame for movement between a load-carrying position and a dumping position, comprising a latch member, a latch member support, means pivotally connecting said latch member to said support for movement between a latched and unlatched position, means pivotally connecting said latch member support to said body for movement between a tightened and a loosened position of said latch member, and cooperating means carried by said body and said chassis frame actuated by movement of said body from dumping to loading position for producing pivotal movement of said latch member support and said latch member from loosened to clamped position of said latch member and to cause it to be held tightly in said clamped position by the weight of said body and its contents.

References Cited in the file of this patent

UNITED STATES PATENTS

| | | |
|---|---|---|
| 1,381,495 | Pearson | June 14, 1921 |
| 1,456,630 | Eaton et al. | May 29, 1923 |
| 1,654,032 | Avery | Dec. 27, 1927 |
| 1,958,908 | Brumbaugh | May 15, 1934 |
| 2,009,466 | Yeager | July 30, 1935 |
| 2,130,951 | Edwards | Sept. 20, 1938 |
| 2,261,745 | Sand | Nov. 4, 1941 |

FOREIGN PATENTS

| | | |
|---|---|---|
| 78,667 | Sweden | Sept. 29, 1931 |